March 25, 1941.  A. G. ZIMMERMAN  2,235,972
SOUND MOTION PICTURE APPARATUS
Filed June 25, 1938
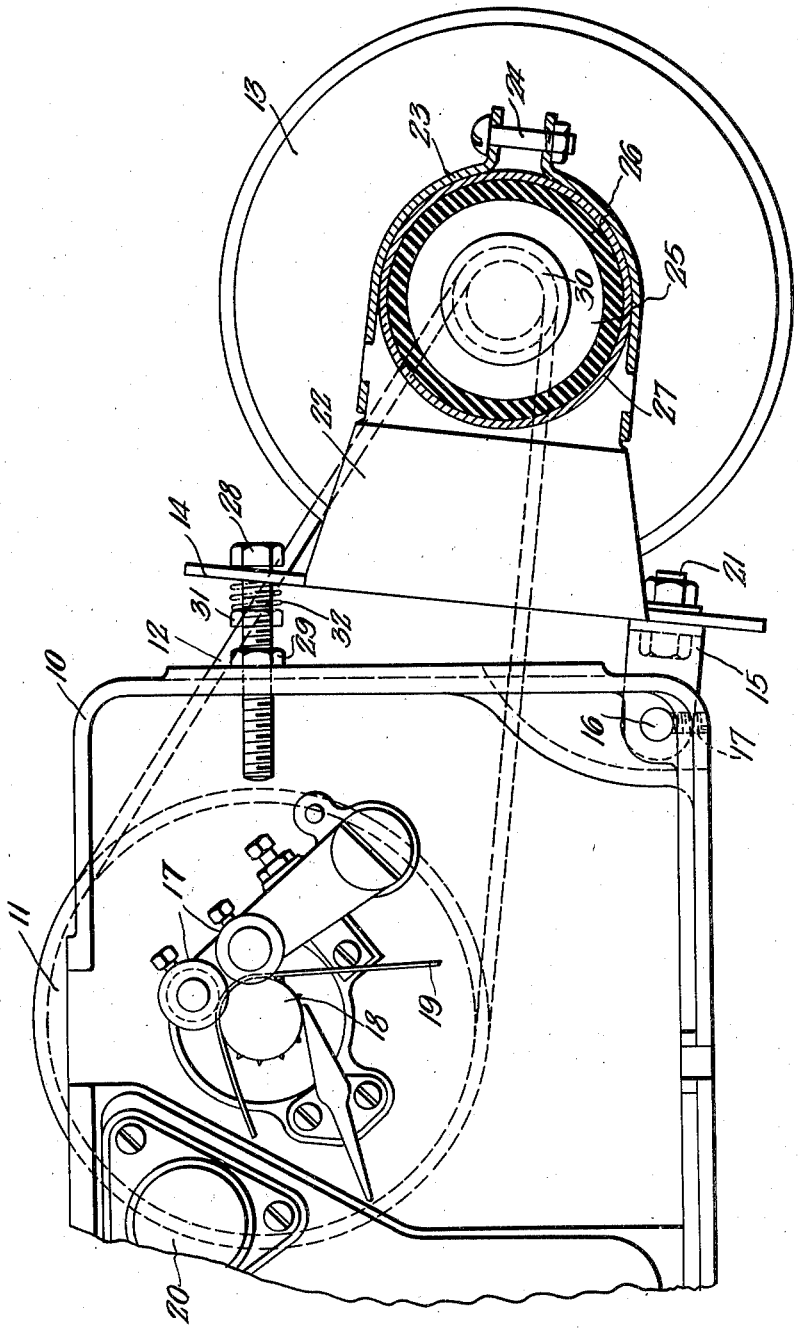
Inventor
Arthur G. Zimmerman
By
Attorney Patented Mar. 25, 1941

2,235,972

UNITED STATES PATENT OFFICE 2,235,972

SOUND MOTION PICTURE APPARATUS

Arthur G. Zimmerman, Indianapolis, Ind., assignor to Radio Corporation of America, a corporation of Delaware Application June 25, 1938, Serial No. 215,765

1 Claim. (Cl. 248—16)

This invention relates to sound motion picture apparatus and, more particularly, to a motor drive for such apparatus.

Both motor and gear drives have been customary in conjunction with such apparatus in the prior art but they have often required a complicated and expensive filter mechanism to absorb the irregularities imparted to the apparatus from the motor and drive mechanism.

In the apparatus according to the present invention, a belt drive from the motor is provided and the motor mounting is so constructed that large irregularities may be absorbed by bodily movement of the motor, while smaller irregularities may be absorbed by the rubber mounting in which the motor is supported.

One object of the invention is to provide an improved motor support for sound motion picture apparatus.

Another object of the invention is to provide an improved shock-absorbing means for the drive of such apparatus.

Another object of the invention is to provide belt-tensioning means for such apparatus.

Another object of the invention is to provide means for absorbing slight irregularities in the operation of the motor driving such apparatus.

Other and incidental objects of the invention will be apparent to those skilled in the art from a reading of the following specification and an inspection of the accompanying drawing, in which the single figure of drawing is an elevation of a motor mounting in accordance with my invention as applied to a soundhead for motion picture apparatus.

In the apparatus as shown, the soundhead casing is represented at 10. This soundhead casing may be supported upon the usual type of pedestal and may support a motion picture projector of any desired type, but both of these features may be omitted if it is desired to use the apparatus only as a film phonograph. The soundhead may, if desired, be constructed substantially as shown and described in Loomis et al. Patent 2,019,147 with the exception of the provision of a belt pulley or flywheel 11 for driving the soundhead and attendant mechanism instead of the gear drive provided in the Loomis et al. construction. This pulley 11 may be driven by the belt or belts 12 which are preferably of the V type and, in order to insure smooth operation, may be two or three in number. The belts 12 are driven by an electric motor 13 which is preferably of the synchronous type, although any substantially constant-speed motor may be used. This motor is supported on a bracket member generally indicated at 14 and which in turn is hinged by a U-shaped bracket member 15 upon the pin 16 extending through the soundhead and secured therein by the set screw 17. This motor 13 drives the sprocket 18 through the pulley 11 and the belts 12. The motion picture projector may, if desired, be geared to the shaft carrying the sprocket 18. The film 19, which is held in cooperative relation with the sprocket 18 by the pad rollers 17, is drawn past a point in appropriate relation to the photocell 20 in a manner substantially as shown and described in the aforesaid Loomis et al. patent.

The motor 13 is supported on the bracket 14 by two members 22, one at each end of the member 14, and these members 22 have turned-up edges 23 formed into a semi-circular shape and held toward each other by the bolt 24. The motor 13 is provided at each end with a cylindrical extension 25 and around this extension 25 there is provided a rubber ring 26 which in turn is encased in a cylindrical metal member 27. This metal member 27 is firmly clamped by the members 23 and the bolt 24 so that any rotational movement of the motor in relation to the bracket 14 is necessarily absorbed by the rubber rings 26. The bracket 14 is held toward the soundhead casing 10 by a cap screw or bolt 28, of which more than two may be provided, if desired. This bolt is threaded into the soundhead casing as indicated and is prevented from rotation therein by a lock nut 29. This bolt is so adjusted as to leave the proper operating tension upon the belts 12, which operating tension is usually less than that which would be provided by the weight of the motor. It will be apparent from the construction thus far described that if any irregularity in one or more of the belts 12 passes over either the motor pulley 30 or the main driving pulley 11, the tension upon the belts will be increased and will tend to move the bracket 14 toward the soundhead against the effect of the weight of the motor 13, thereby decreasing the effect of any such irregularity upon the rotational speed of the pulley 11. If the tension provided upon the belts 12 by the weight of the motor 13 is not sufficient, an auxiliary nut 31 may be provided on the bolt 28 and a suitable helical spring may be provided between this nut 31 and the rear face of the bracket 14, thereby increasing the tension upon the belts to any desired amount.

Small irregularities in the rotational motion of the pulley of the motor 13 or other small irregularities in the belts 12 or either the pulley 11 or the pulley 30, which are of sufficient magnitude to react upon the rotor of the motor but which are insufficient to cause a lifting of the motor and the bracket 14, will tend to cause the frame of the motor 13 to rotate a corresponding amount and any such rotational tendency will be absorbed by means of the circular rubber members 26.

It will be apparent from the foregoing that I have provided a construction in which small and sudden or high-speed periodic vibrations will be absorbed by means of the rubber absorbing members 26, while larger vibrations or irregularities, either in the motion of the motor or due to the irregularities of the construction of the several members of the driving train, will be absorbed by bodily movement of the motor and its supporting bracket.

Having now described my invention, I claim:

A hanger for supporting an electric motor comprising a bracket secured to the motor at one side thereof, hinge means supporting said bracket adjacent the bottom of the motor, an adjustable rigid stop abutting said bracket adjacent the top thereof, for adjusting belt tension, and resilient means pressing said bracket toward said stop, whereby said bracket may move away from said stop against the weight of the motor and the pressure of said resilient means in response to excessive belt tension.

ARTHUR G. ZIMMERMAN.